United States Patent [19]

Watanabe

[11] 4,307,402

[45] Dec. 22, 1981

[54] DIRECTION FINDER

[75] Inventor: Mikio Watanabe, Kobe, Japan

[73] Assignee: Furuno Electric Company, Limited, Nagasaki, Japan

[21] Appl. No.: 106,572

[22] PCT Filed: Mar. 27, 1979

[86] PCT No.: PCT/JP79/00075

§ 371 Date: Jan. 16, 1980

§ 102(e) Date: Dec. 26, 1979

[87] PCT Pub. No.: WO79/01036

PCT Pub. Date: Nov. 29, 1979

[51] Int. Cl.³ .............................................. G01S 5/04
[52] U.S. Cl. .................................................. 343/120
[58] Field of Search ............... 343/118, 119, 120, 122, 343/123, 124

[56] References Cited

U.S. PATENT DOCUMENTS 3,344,430  9/1967  Hildebrand ......................... 343/119
3,795,001  2/1974  Poppe et al. ....................... 343/119
3,987,446  10/1976  Lipsky et al. ...................... 343/120
4,194,207  3/1980  Zauscher ........................... 343/123

*Primary Examiner*—Theodore M. Blum
*Attorney, Agent, or Firm*—Jordan and Hamburg

[57] ABSTRACT

A direction finder having two directive loop antennas mutually orthogonally disposed and a non-directional vertical antenna. Due to the difference in line constant between the loop antenna channels and the vertical antenna channel, the voltage signals induced in one of the loop antennas can not be combined with the ones induced in the vertical antenna in a mutual phase relationship of the same or the opposite phase, which causes errors in measuring a correct bearing of a source of incoming signals. Such errors in bearing indication are eliminated by combining the voltage signals induced in one of the loop antennas and in the vertical antenna to obtain positive phase and negative phase combined voltage signals with 180° out of phase to one another, and by generating driving signals for an indicator based on the rectified voltage signals from the vertical antenna and the rectified combined signals appropriately selected.

8 Claims, 13 Drawing Figures

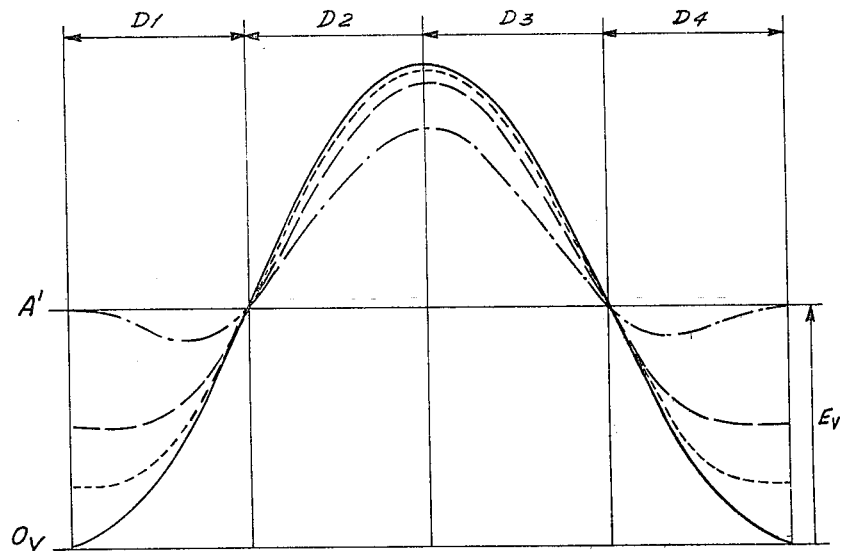
FIG. 6A'
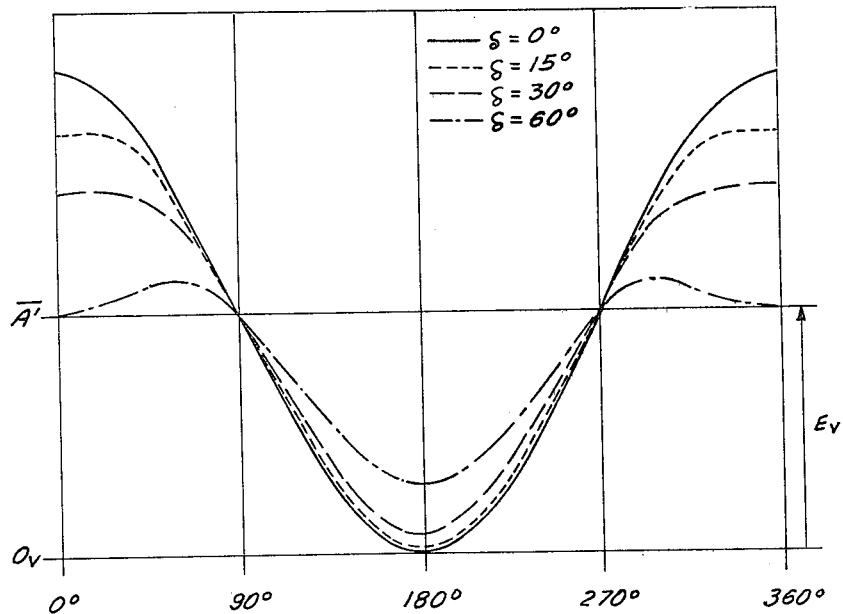
FIG. 6Ā'

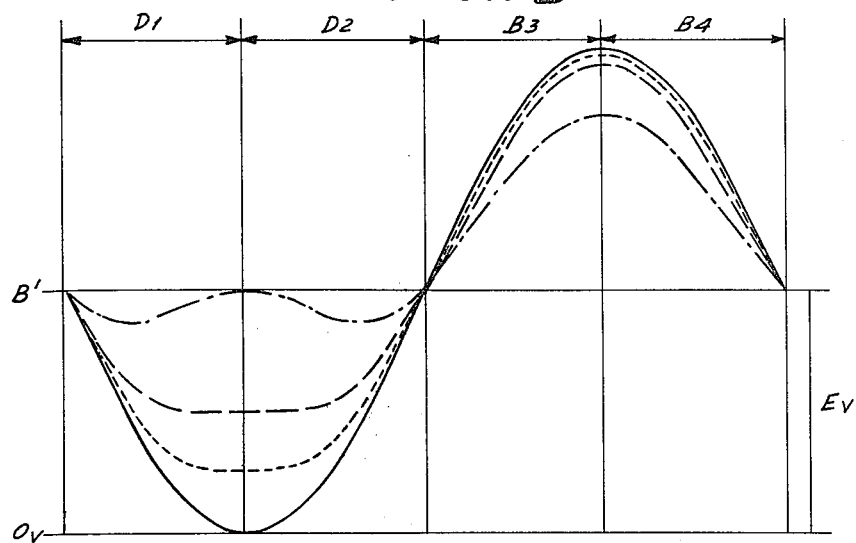
FIG.7B'
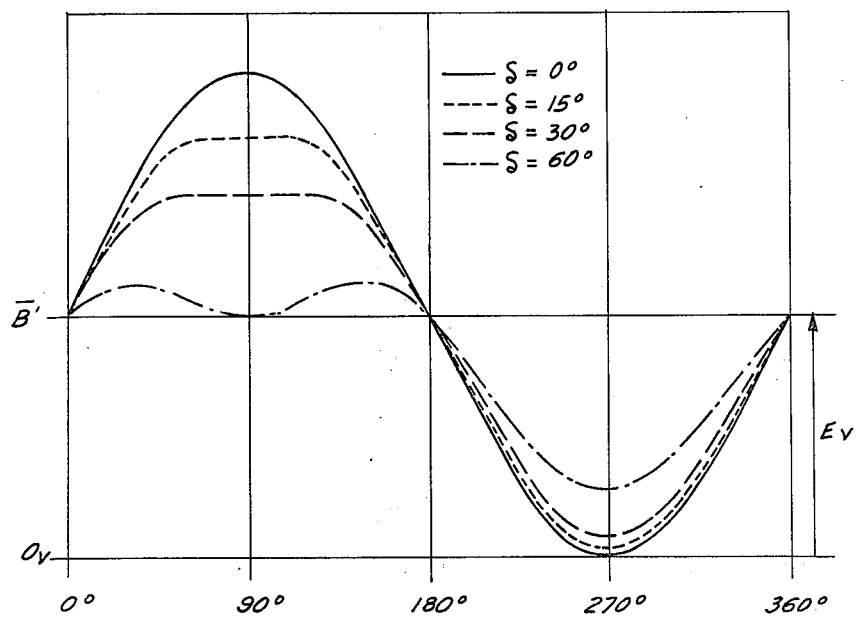
FIG.7B̄'

FIG.8A"
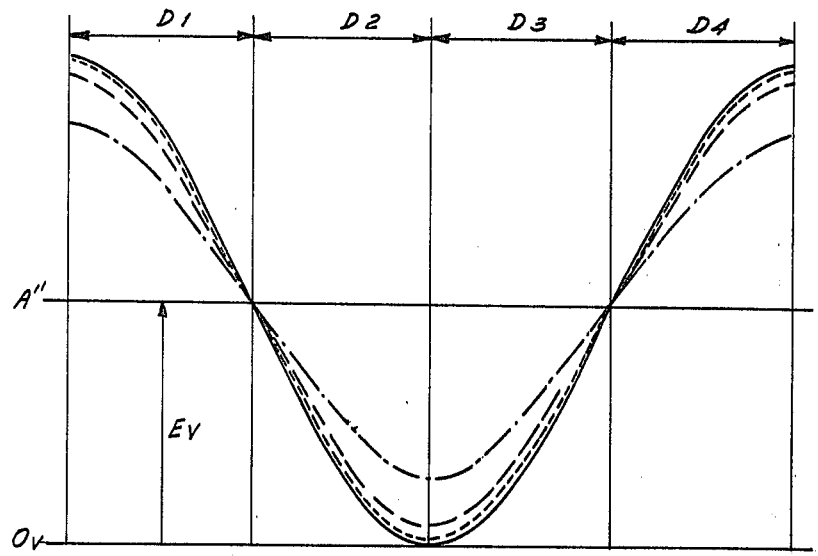
FIG.8B"

DIRECTION FINDER

BACKGROUND OF THE INVENTION

This invention relates to a direction finder including a directive X-axis antenna having a directional sensitivity pattern in the direction of the X-axis of Cartesian co-ordinates, a directive Y-axis antenna having a directional sensitivity pattern in the direction of the Y-axis thereof and a non-directional antenna. The direction finder separately combines voltage signals induced in the non-directional antenna and voltage signals induced in each of the directive antennas to produce combined voltage signals in association with each of the X-axis and Y-axis antennas, and respectively generates X-axis and Y-axis component signals by utilizing the combined voltage signals and the voltage signals induced in the non-directional antenna with these voltage signals being amplified and rectified, and indicates the direction determined by a vector addition of the X-axis and Y-axis component signals as a correct bearing of a source of incoming signals. More particularly, this invention relates to a direction finder of this type capable of precisely indicating a correct bearing of incoming signals.

PRIOR ART STATEMENT

Various kinds of direction finders having by way of example of the two loop antennas respectively having directional sensitivity patters in mutually orthogonal directions and a non-directional vertical antenna have, so far, been proposed. As one type of these direction finders, such a direction finder has been proposed that separately combines and rectifies the voltage signals induced in the non-directional antenna and the voltage signals induced in each of the loop antennas having directional sensitivity patterns in the X-axis and Y-axis directions, and produces the X-axis and Y-axis component signals necessary for indication by utilizing these rectified combined voltage signals, and indicates the direction determined by a vector addition of these component signals as a correct bearing of a source of incoming searched signals. This kind of direction finder has been disclosed, for example, in Japanese Patent Publication No. 9722 of 1958 and Japanese Patent Publication No. 10728 of 1959.

In this kind of direction finder, the voltage signals induced in the vertical antenna must be combined with the voltage signals induced in each of the loop antennas in phase relationship of exactly the same phase or 180° out of phase with each other, in order to precisely measure the bearing of a source of incoming searched signals. In actual cases, however, due to the difference in line constant between the loop antenna channels and the vertical antenna channel, the phase difference therebetween is inevitably produced and observed at the moment of the combination. This phase difference has caused errors in bearing indication, thus rendering the direction finder incapable of indicating a correct bearing of the source of the searched radio waves incident to the antennas. Moreover, such errors in indication differ depending on the bearing of the source of incoming searched signals, thus making it difficult to manufacture commercially usable direction finders.

BRIEF DESCRIPTION OF DRAWINGS

FIGS. 6A', 6$\overline{A}$', 7B', 7$\overline{B}$', 8A'', and 8B'' are diagrammatic representations of characteristic curves of voltage for explaining the operation of the embodiment according to the present invention;

SUMMARY OF THE INVENTION

First, the technical problem to be solved by the present invention will be explained with reference to a prior art system.

Figure 1:
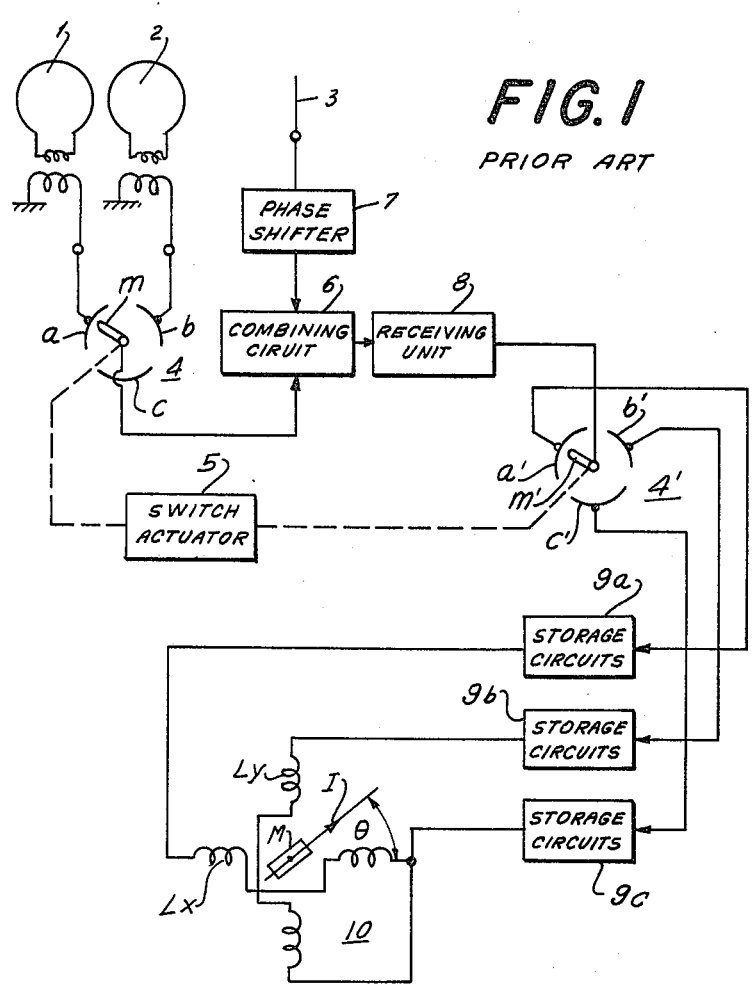
FIG. 1 is a schematic block diagram of a prior art system.

Referring to FIG. 1, loop antennas 1 and 2 are respectively disposed on mutually perpendicular X-axis and Y-axis of Cartesian co-ordinates. An antenna 3 is a non-directional vertical antenna.

The signals induced in the directional loop antennas 1 and 2 are transmitted to a switch 4. The switch 4 comprises contact elements a, b, c and a moving connector m, and is driven by a switch actuator 5. The voltage signals induced in the loop antennas 1 and 2 are respectively connected to the contact elements a and b of the switch.

The output signals derived by the moving connector m of the switch 4 are transmitted to a combining circuit 6. The combining circuit 6 functions to combine these derived signals with the voltage signals induced in the non-directional antenna 3 and fed thereto through a phase shifter 7.

Thus, the combining circuit 6 combines the voltages induced in the loop antenna 1 and the non-directional antenna 3 with each other, during the period the moving connector m is connected to the contact element a of the switch 4. Similarly, it combines the voltages induced in the loop antenna 2 and the non-directional antenna 3 with each other, during the period the moving connector m is connected to the contact element b. The combining circuit 6 produces output signals in response only to the voltages induced in the non-directional antenna 3 when the moving connector m is connected to the contact element c, since the moving connector m does not pass the output signals from any one of the loop antennas 1 and 2. It should be noted that the phase shifter 7 functions to shift the voltages induced in the non-directional antenna 3 to bring these voltages and the voltages induced to one of the loop antennas 1 and 2 in phase or 180° out of phase with each other.

The combined output signals from the combining circuit 6 are transmitted to a moving connector m' of a switch 4', after being amplified and rectified in a receiving unit 8.

The switch 4' is driven by the switch actuator 5 to perform switching operation in synchronism with that of the switch 4, thereby selectively transmitting the rectified output signals from the receiving unit 8 to each corresponding one of storage circuits 9a, 9b and 9c.

The storage circuit 9a operates to store the combined voltages obtained by combining the signal voltages induced in the loop antenna 1 and the nondirectional antenna 3 to one another.

Figure 2:
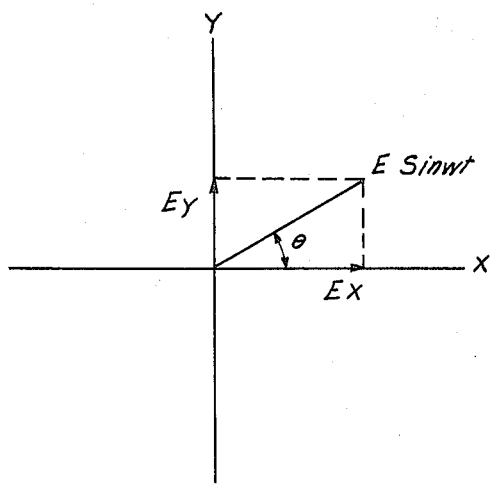
FIG. 2 is an explanatory diagram for explaining the operation of the prior art system.

As illustrated in FIG. 2, when radio waves Esin wt come from a direction $\theta$ with respect to the X-axis, signals Ecos $\theta$ sin wt are induced in the X-axis loop antenna 1. These induced signals are combined with the voltage signals induced in the nondirectional antenna 3 to become $$E(\cos \theta + 1) \sin wt$$

These combined signals are rectified by the receiving unit 8 to result in signals $E(\cos \theta + 1)$ representing the amplitude variation of the combined voltage signals. The rectified voltage signals are stored in the storage circuit 9a.

In the similar manner, the storage circuit 9b stores the signals $E(\sin \theta 1)$ which are obtained by combining the voltages induced in the loop antenna 2 and the nondirectional antenna 3 with each other and by detecting them.

The storage circuit 9c stores the rectified voltage signals E, since it receives only the voltages induced in the nondirectional antenna 3.

A bearing indicator 10 comprises a X-axis exciting coil $L_x$, a Y-axis exciting coil $L_y$, magnet M and a bearing pointer I. The magnet M is caused to point in the direction determined by a vector addition of the magnetic field created by the exciting coil $L_x$ and the one created by the exciting coil $L_y$, and hence the bearing pointer is directed in the same direction.

The voltage signals $E(\cos \theta + 1)$ stored in the storage circuit 9a are applied to the X-axis exciting coil $L_x$, and the voltage signals $E(\sin \theta + 1)$ stored in the storage circuit 9b are applied to the Y-axis exciting coil $L_y$, and the signals E stored in the storage circuit 9c are applied in common to the one end of each of the X-axis and Y-axis exciting coils.

Consequently, the X-axis exciting coil $L_x$ is excited by the difference voltage signals E cos $\theta$ obtained by substracting E from the stored voltage $E(\cos \theta + 1)$, and the Y-axis exciting coil $L_y$ is excited by the difference signals E sin $\theta$ obtained by substracting E from the stored voltages $E(\sin \theta + 1)$, thereby pointing the magnet M in the direction $\theta$ determined by a vector addition of the two magnetic fields and thus making the bearing pointer point at the bearing $\theta$ of radio waves' incident on the antennas.

The aforementioned apparatus indicates a bearing of a source of incoming radio waves by utilizing magnitude ratio of the voltage signals induced in the directional loop antenna 1 to the ones induced in the other loop antenna 2, with the loop antennas 1 and 2 being mutually perpendicularly disposed. In this apparatus in order to make the bearing indicated by the bearing indicator 10 to exactly coincide with the bearing of a source of incoming radio waves, the magnitude of the respective ones of the combined voltages produced by the combination circuit 6 must be varied in predetermined manners correspondingly with the change of the direction of incoming radio waves. In order to attain this object, the phase relationship between the voltage signals induced in each of the X-axis and Y-axis loop antennas and the ones induced in the non-directional antenna 3 must always be maintained to be in phase or 180° out of phase with each other when they are received and combined by the combining circuit 6.

Actually, however, the phase difference between the two kinds of the signals is inevitably generated due to the difference in line constant between the loop antenna channels and the non-directional antenna channel, and observed when they are received and combined with each other by the combining circuit 6. Such a phase difference causes an error in a bearing indication.

The mutual relationship between the phase difference and the errors in bearing indication will be explained as follows:

Referring to FIG. 2, when the radio waves:

$$E \sin wt$$

come from the direction O with respect to the X-axis, voltage signals:

$$E \cos \theta \sin wt$$

are induced in the X-axis loop antenna 1, and the voltage signals:

$$E \sin \theta \sin wt$$

are induced in the Y-axis loop antenna 2.

The non-directional antenna 3 induces voltages having phase 90° spaced with respect to that of the voltage signals induced in the loop antennas 1 and 2. The voltage signals from the antenna 3 are phase-shifted by the phase shifter 7 to establish phase coincidence with the voltage signals from one of the loop antenna channels. In actual cases, however, when these phase-shifted voltage signals are received by the combining circuit 6, the phase difference $\delta$ is measured with respect to the signals from the loop antenna channels, and hence the received signals are represented by $$E \sin (wt + \delta).$$

The combined signals $E_x$ obtained by combining the received signals with the signal voltages transmitted from the X-axis loop antenna 1 become $$\begin{aligned} E_x &= E \cos \theta \sin wt + E \sin (wt + \delta) \\ &= E(\cos \theta + \cos \delta) \sin wt + E \sin \delta \cos wt \\ &= E \sqrt{(\cos\theta + \cos \delta)^2 + \sin^2 \delta} \, \sin (wt + \delta) \\ \text{where, } \delta &= \tan^{-1} \frac{\sin \delta}{\cos \theta + \cos \delta} \end{aligned} \quad (1)$$

Similarly, the combined signals $E_y$ obtained by combining said received signals with the signal voltages transmitted from the Y-axis loop antenna 2 become $$\begin{aligned} E_y &= E \sin \theta \sin wt + E \sin (wt + \delta) \\ &= E (\sin\theta + \cos\delta) \sin wt + E \sin\delta \cos wt \\ &= E \sqrt{(\sin\theta + \cos\delta)^2 + \sin^2\delta} \, \sin (wt + \beta) \\ \text{where, } \beta &= \tan^{-1} \frac{\sin \delta}{\sin \theta + \cos \delta} \end{aligned} \quad (2)$$

FIG. 3 illustrates the magnitude variation of the combined voltage signals represented by the equations (1) and (2) depending on the bearing of a source of the radio waves incident on the antennas.

Figure 3A:
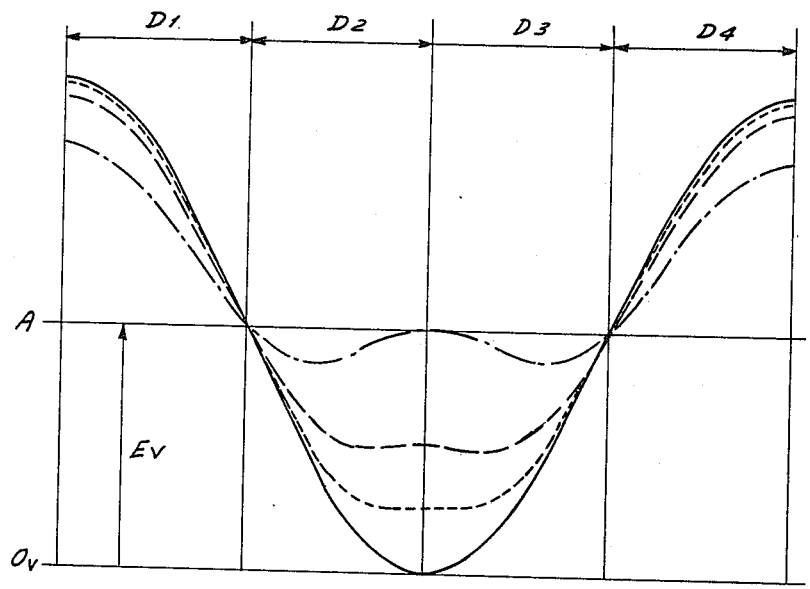
FIGS. 3A and 3B are a diagrammatic representation of characteristic curves of voltage for explaining the operation of the said prior art system or a system according to an embodiment of the present invention.
Figure 3B:
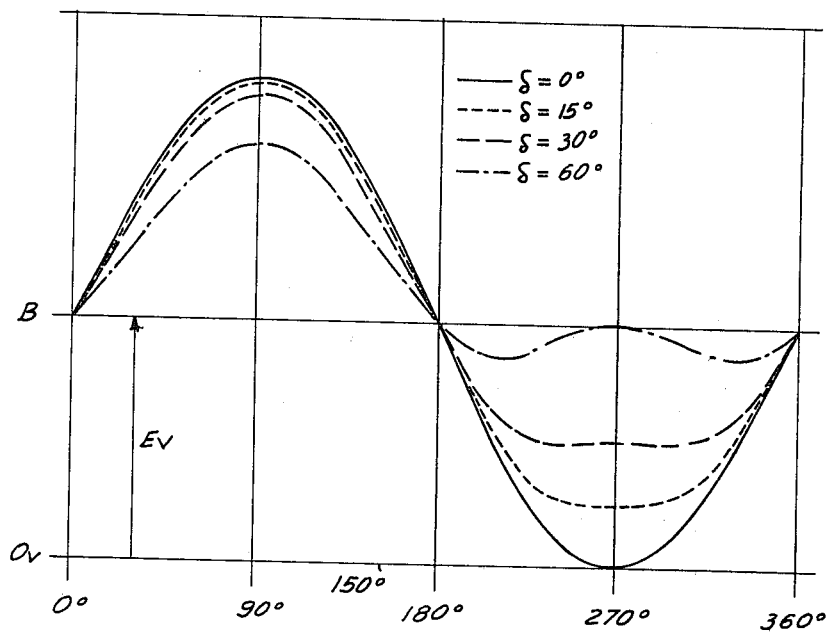

FIG. 3A shows the magnitude variation of the combined signals $E_x$ represented by the equation (1) obtained by combining voltage signals induced in the X-axis loop antenna and the non-directional antenna 3. FIG. 3B illustrates the magnitude variation of the combined signals represented by the equation (2), obtained by combining with each other the voltage signals induced in the Y-axis loop antenna and the non-directional antenna 3. Referring to FIG. 3A and FIG. 3B, full line curves are the characteristic curves obtained by combining the reception signals transmitted from the loop antenna channels and from the non-directional antenna 3, with the two kinds of the signals being maintained in phase or 180° out of phase with each other, in other words with δ in the equations (1) and (2) being zero. Dotted curves are the characteristic curves obtained by combining the reception signals transmitted from the loop antenna channels and from the non-directional antenna with the phase difference therebetween being maintained at 15° (δ=15°). Dash line and dot-dash line curves are characteristic curves respectively with δ being 30° and with δ being 60°.

As is apparent from FIG. 3A and FIG. 3B, with the phase difference δ being zero, the magnitude of the respective combined signals $E_x$ and $E_y$ respectively obtained in association with the X-axis loop antenna 1 and the Y-axis loop antenna 2 respectively varies cosinewise and sinewise for all the possible directions of a source of the radio waves incident to the antennas. Accordingly, the bearing pointer I precisely indicates the bearing of incoming radio waves, since the direction determined by a vector addition of the magnetic fields created by the X-axis and Y-axis exciting coils $L_x$ and $L_y$ of the bearing indicator 10 also correspondingly varies with the change of the bearing of a source of the radio waves incident to the antennas.

With the phase difference δ, the magnitude of the combined signals $E_x$ in association with the X-axis loop antenna 1 varies also cosinewise with the change of the bearing of incoming radio waves within each of the azimuth ranges from 0° to 90° and from 270° to 360°, as illustrated in FIG. 3A. Whereas, within the azimuth range from 90° to 270°, the magnitude of the combined voltage signals $E_x$ traces distorted cosine curves.

Similarly, the magnitude of the combined voltage signals $E_y$ in association with the Y-axis loop antenna 2 varies in a sinusoidal way for azimuth angles from 0° to 180°, but traces distorted sine curves for azimuth angles from 180° to 360°.

Consequently, with the phase difference δ, the direction determined by a vector addition of the magnetic fields created by the X-axis and Y-axis exciting coils $L_x$ and $L_y$ of the bearing indicator can not faithfully follow the change of the bearing of incoming radio waves incident to the antennas. This causes the bearing pointer I to indicate a different bearing than a true bearing of a source of radio waves incident to the antennas.

Assuming now that radio waves come from a bearing of 150°, the magnitude ratio of the voltage signals $E_y$ applied to the Y-axis exciting coil $L_y$ to the ones $E_x$ applied to the X-axis exciting coil $L_x$ must be $$(E_y/E_x) = -0.57735$$

in order to make the bearing pointer I indicate the correct bearing of 150°.

With the phase difference being 60°, however, the combined voltage signals $E_x 60$ obtained by combining the voltage signals induced in the X-axis loop antenna 1 with the ones from the vertical antenna 3 become, in accordance with the equation (1), $$E_x 60 = 0.940 E$$

Whereas, the combined voltage signals $E_y 60$ obtained by combining the voltage signals induced in the Y-axis loop antenna 2 with the ones from the vertical antenna 3 become, in accordance with the equation (2), $$E_y 60 = 1.323 E$$

The X-axis and Y-axis exciting coils $L_x$ and $L_y$ are respectively excited by the difference signal voltages $E_x$ and $E_y$ respectively obtained by subtracting the signal voltages E originating in the vertical antenna 3 from the combined voltage signals $E_x 60$ and $E_y 60$. The exciting voltages $E_x$ for the X-axis exciting coil $L_x$ become $$E_x = 0.940 E - E = -0.06 E$$

The exciting voltages $E_y$ for the Y-axis exciting coil $L_y$ become $$E_y = 1.323 E - E = 0.323 E$$

As a result, ratio of the magnitude of the voltages becomes $$\frac{E_y}{E_x} = \frac{0.323}{-0.06} = -5.383$$

thus resulting in an indicated bearing θ.

$$\theta = \tan^{-1} - 5.383$$
$$= 100.5°$$

As apparent, an indication error in this case becomes 49.5°, since the indicated bearing is 100.5° against the correct bearing of 150°.

An object of this invention is to provide a direction finder capable of indicating a true bearing of a source of searched signals, even in such a case that the line constant of the loop antenna channels is different from the one of the vertical antenna channel.

A direction finder according to this invention includes a directive X-axis antenna having a directional sensitivity pattern in the direction of the X-axis of Cartesian co-ordinates and a directive Y-axis antenna having a directional sensitivity pattern in the direction of the Y-axis thereof and a non-directional antenna, and separately combines the voltage signals induced in each of the directive X-axis and Y-axis antennas and the voltage signals induced in the non-directional voltage signals to produce combined voltage signals in association with each of the directive X-axis and Y-axis antennas, and respectively generates X-axis and Y-axis component signals by utilizing the combined voltage signals and the voltage signals induced in the non-directional antenna, with these voltage signals being amplified and rectified, and indicates the direction determined by a vector addition of the X-axis and Y-axis component signals as a correct bearing of a source of the searched incoming signals incident to the antennas. More particularly, it combines and rectifies the voltage signals induced in the directive antennas and the ones induced in the non-directional antenna to separately obtain rectified positive phase and negative phase combined voltage signals with a phase relationship of 180° apart to one another for each of the directive X-axis and Y-axis antennas, and appropriately selecting the rectified positive phase combined voltage signals and the rectified negative phase combined voltage signals within an azimuth range wherein the magnitude of the rectified positive phase and negative phase combined voltage signals varies in distorted manners with respect to sine or cosine curves correspondingly with the change of the bearing of a source of incoming searched signals. Such an arrangement serves to achieve the required objects.

DETAILED DESCRIPTION OF A PREFERRED EMBODIMENT

Hereinafter, each of the components which is given the same reference numerals as in FIG. 1 performs the same function.

Figure 4:
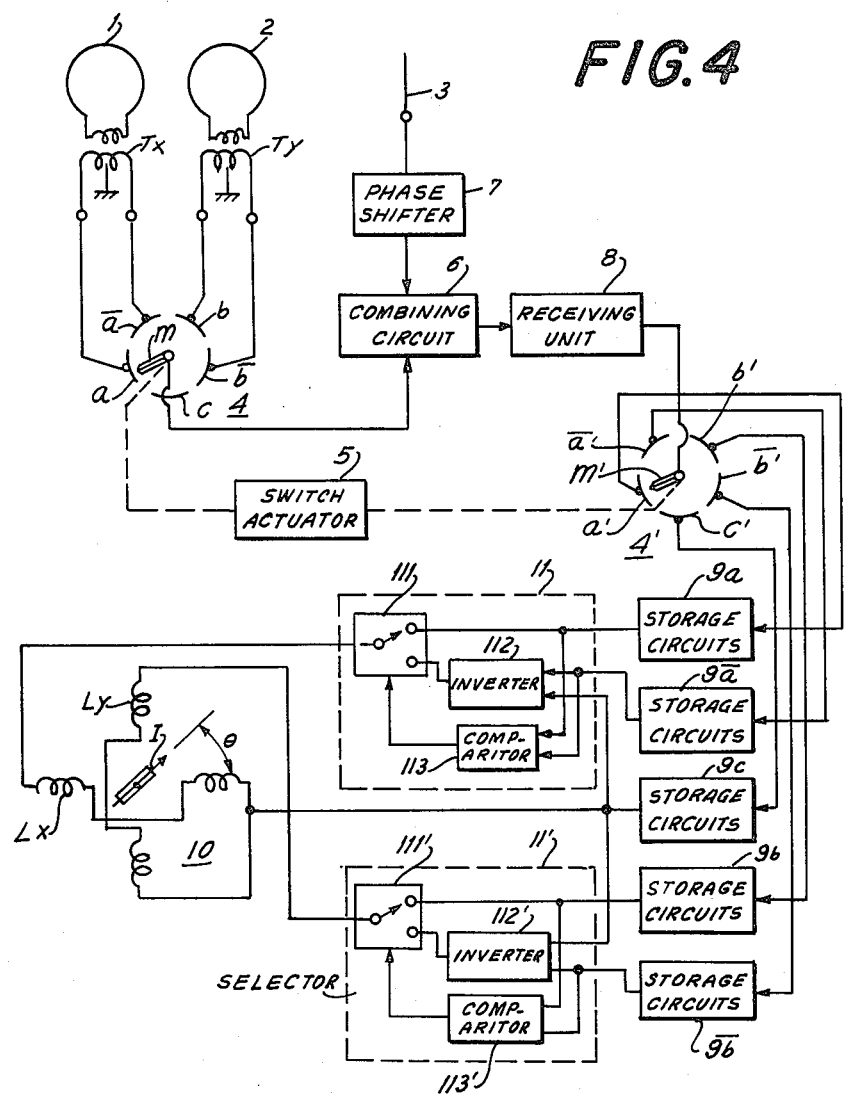
FIG. 4 is a schematic block diagram of an embodiment according to the present invention.

Referring to FIG. 4, the voltage signals induced in the X-axis loop antenna 1 are supplied to the switch 4 from the secondary winding of a transformer Tx. The mid point of the secondary winding of the transformer Tx is grounded, and from both ends of the winding thereof voltage signals with the same magnitude and with their phase relationship being 180° out of phase with each other are respectively transmitted to contact elements a and $\bar{a}$.

Similarly, signal voltages, originating in the Y-axis loop antenna 2 and with the same magnitude and with their phase being 180° out of phase with each other, are respectively transmitted to contact elements b and $\bar{b}$.

The switch 4 comprises the contact elements a, $\bar{a}$, b, $\bar{b}$, c, and the moving connector m, and successively performs switching operation by using the moving connector m. The signals derived by the moving connector m are transmitted to the combining circuit 6, and are combined with the voltage signals induced in the vertical antenna 3 as the same manner in FIG. 1. The output signals from the combining circuit 6 are, after being amplified and rectified in the receiving unit 8, transmitted to the moving connector m' of the switch 4'.

The switch 4' is driven by the switch actuator 5 to perform a switching operation in synchronism with that of the switch 4, thereby selectively transmitting the output signals from the receiving unit 8 to each of the corresponding contact elements a', $\bar{a}'$, b', $\bar{b}'$, and c'. The contact elements a' and $\bar{a}'$, of the switch 4' are respectively connected to storage circuits 9a and $9\bar{a}$. The contact elements b' and $\bar{b}'$ of the switch are respectively connected to storage circuits 9b and $9\bar{b}$. The contact element c' is connected to the storage circuit 9c.

Therefore, when the moving connector m' is connected to the contact element a', the storage circuit 9a stores the combined voltage signals in accordance with the equation (1), which result from a combination of the voltage signals induced in the X-axis loop antenna 1 and the vertical antenna 3.

As a next step, at the moment the moving connector m' is connected to the contact element $\bar{a}'$, the voltage signals:

$$-E\cos\theta \sin wt$$

which are reverse in polarity as the ones induced in the X-axis loop antenna 1, are transmitted from the contact element $\bar{a}$ of the switch 4 to the combining circuit 6 and are combined therein with the voltages $$E \sin(wt+\delta)$$

induced in the vertical antenna 3.

The resultant combined voltage signals $\bar{E}_x$ become $$\begin{align}\bar{E}_x &= -E\cos\theta \sin wt + E\sin(wt + \delta) \tag{3}\\ &= E(\cos\delta - \cos\theta)\sin wt + E\sin\delta \cos wt\\ &= E\sqrt{(\cos\delta - \cos\theta)^2 + \sin^2\delta}\ \sin(wt + \delta')\\ \text{where,}\ \delta' &= \tan^{-1}\frac{\sin\delta}{\cos\delta - \cos\theta}\end{align}$$

and these are stored in the storage circuit 9a.

Next, when the moving connector m' is switched to the contact element b', the hold circuit 9b holds the combined voltage signals $E_y$ in accordance with the equation (2), which result from a combination of the voltage signals induced in the Y-axis loop antenna 2 and the vertical antenna 3.

At the moment the moving connector m' is connected to the contact element $\bar{b}$, the combining circuit 6 combines the voltage signals:

$$-E\sin\theta \sin wt$$

which are reverse in polarity as the ones induced in the Y-axis loop antenna 2, with the voltage signals:

$$E\sin(wt+\delta)$$

transmitted from the vertical antenna 3.

The resultant combined voltage signals $\bar{E}_y$ become $$\begin{align}\bar{E}_y &= -E\sin\theta \sin wt + E\sin(wt + \delta) \tag{4}\\ &= E(\cos\delta - \sin\theta)\sin wt + E\sin\delta\cos wt\\ &= E\sqrt{(\cos\delta - \sin\theta)^2 + \sin^2\delta}\ \sin(wt + \beta')\\ \text{where,}\ \beta' &= \tan^{-1}\frac{\sin\delta}{\cos\delta - \sin\theta},\end{align}$$

and are stored in the storage circuit $9\bar{b}$.

Further, at the moment the moving connector is switched to the contact element c', the only signal voltages $$E\sin(wt+\delta)$$

from the vertical antenna 3 are transmitted to the storage circuit 9c and are maintained thereby.

It should be noted that the rectified output signals from the receiving unit 8 are supplied to the respective storage circuits 9a, $9\bar{a}$, 9b, $9\bar{b}$ and 9c, and hence the voltage signals representing the magnitude of the combined signals obtained in accordance with each of the equations are maintained in corresponding one of the storage circuits.

The voltages held in both of the storage circuits 9a and $9\bar{a}$ are supplied to a selection circuit 11, and the voltages held in either one of the storage circuits are selectively connected to the X-axis coil $L_x$ of the bearing indicator 10.

The selection circuit 11 comprises a selection switch 111, an inversion circuit 112 and comparison circuit 113.

The voltages held in the storage circuit 9a are connected to one input terminal of the selection switch 111, and the voltages maintained in the hold circuit $9\bar{a}$ are supplied to the other input terminal thereof after being inverted in polarity by the inversion circuit 112. The inversion circuit 112, with the voltages stored in the storage circuit 9c being supplied thereto, inverts in polarity the output voltage signals from the storage circuit $9\bar{a}$ at a level of the magnitude of the stored voltages in the circuit 9c.

Figure 5:
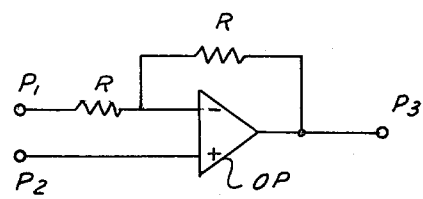
FIG. 5 is the diagram of the circuit configuration of an inversion circuit used in the said embodiment according to the present invention.

As illustrated in FIG. 5, the inversion circuit 112 includes an operational amplifier OP with the output signals from the storage circuit 9a being supplied to the input terminal P$_1$ and with the output signals from the storage circuit 9c being supplied to the input terminal P$_2$, and at the output terminal thereof inverted voltage signals are produced.

The comparison circuit 113 functions to compare magnitude of the voltages held in each of the storage circuits 9a and 9ā with each other, and to control the selection switch 111 to pass the voltages held in the storage circuit 9a when the magnitude of the voltages stored in the storage circuit 9a is larger than that of the hold circuit 9ā. Conversely, when the voltages maintained in the storage circuit 9ā are larger than those of the other circuit 9a, it controls the selection switch 111 to pass the output voltages from the inversion circuit 112.

The operations by the comparison circuit 113 can be performed by the comparison circuit comprising logic circuits. The comparison circuit compares the magnitude of the voltages maintained in each of the storage circuits 9a and 9ā with each other, and produces a high level output signal when the magnitude of the voltages held in the storage circuit 9a is larger than that of the other circuit, thereby controlling the selection switch 111 to pass the voltages from the storage circuit 9a. Conversely, when the magnitude of the voltages stored in the storage circuit 9ā is larger than that of the other circuit, it produces a low level output signal, thereby controlling the selection switch 111 to pass the output signals from the inversion circuit 112.

With such a circuit configuration, a variation manner of the magnitude of the output voltage signals from the selection switch 111 depending on the bearing of a source of the radio waves incident to the antennas will be considered.

First, as explained in the foregoing, the magnitude of the voltages in the storage circuit 9a varies in a manner as illustrated in FIG. 3A. The magnitude variation of the voltages in the storage circuit 9ā varies in accordance with the equation (3) and is represented as in FIG. 6A'. The inversion circuit 112 reverses these characteristic curves of voltage, thereby producing the voltage signals represented by the characteristic curves in FIG. 6Ā'.

Comparison between FIG. 3A and FIG. 6A' reveals that the magnitude of the voltages held in the storage circuit 9a (FIG. 3A) is larger than that of the other circuit for azimuth angles from 0° to 90° wherein the bearing of a source of incoming radio waves lies. Hence, within the azimuth range D$_1$, the selection switch 111 passes the voltages stored in the storage circuit 9a (FIG. 3A).

Within the azimuth ranges D$_2$, D$_3$ from 90° to 270°, the magnitude of the voltages held in the storage circuit 9ā (FIG. 6A') is larger than that of the other circuit. Hence, within these azimuth ranges D$_2$ and D$_3$, the output voltages (FIG. 6Ā') from the inversion circuit 112 are passed through the selection switch 111.

Within the azimuth range D$_4$ from 270° to 360°, the magnitude of the voltages stored in the storage circuit 9a (FIG. 3A) becomes larger than that of the other circuit, and accordingly, the stored voltages (FIG. 3A) are passed through the selection switch 111.

Consequently, the magnitude of the output voltages from the selection circuit 11 varies, depending on the incidence bearing of radio waves to the antennas, as illustrated in FIG. 8A''. This diagram clearly reveals that the magnitude of the output voltages from the selection circuit 11 varies almost cosinewise even when the voltage signals originating in the X-axis loop antenna 1 and those originating in the vertical antenna 3 are not exactly in phase or 180° out of phase with each other at the moment they are combined by the combining circuit 6.

In the similar manner as the selection circuit 11 selecting the voltage signals stored in either the storage circuit 9a or the storage circuit 9ā, the voltages held in the storage circuits 9b and 9b̄ are supplied to selection circuit 11' and selectively passed thereby.

The selection circuit 11' is constructed exactly in the same way as the selection circuit 11. The output signals from the storage circuit 9b are applied to selection switch 111', and the ones from the storage circuit 9b̄ are transmitted to the selection switch 111' through an inversion circuit 112'.

FIG. 7B', illustrates the magnitude variation of the voltages stored in the storage circuit 9b̄, and FIG. 7B̄' shows the magnitude variation of the voltage signals inverted in polarity by the inversion circuit 112'.

The waveform comparison between FIG. 3B and FIG. 7B' reveals that the voltage signals (FIG. 3B) stored in the storage circuit 9b are produced within the azimuth ranges D$_1$ and D$_2$ from 0° to 180°, and the output voltages B̄' from the inversion circuit 112' are produced within the azimuth ranges D$_3$ and D$_4$ from 180° to 360°. Consequently, the selection switch 111' produces the voltages as represented by the characteristic curves of voltage in FIG. 8B''.

The output voltages (FIG. 8A'' and FIG. 8B'') from the selection circuits 11 and 11' are respectively transmitted to the X-axis exciting coil L$_x$ and Y-axis exciting coil L$_y$ of the bearing indicator 10, and accordingly a bearing is indicated in the same way as in FIG. 1. As apparent from FIG. 8, the exciting voltages applied to one of the exciting coils L$_x$ and L$_y$ vary cosinewise or sine-wise correspondingly with the change of the bearing of a source of incoming radio waves. Therefore, the direction of the combined magnetic field created by the X-axis and Y-axis exciting coils L$_x$, L$_y$ varies exactly correspondingly with the change of the incidence bearing of radio waves. This makes the bearing pointer I indicate a correct bearing of a source of incoming radio waves, as opposed to an incorrect bearing indicated by the prior art apparatus.

As aforementioned, this invention generates positive phase and negative phase voltages from the voltage signals induced in each of the loop antennas, and combines the generated voltages and the voltage signals induced in the vertical antenna to respectively obtain the corresponding characteristic curves of voltage in FIG. 3, FIG. 6 and FIG. 7 representing the magnitude variation of voltage signals against the bearing of a source of incoming radio waves. Further, the invention derives the portions of each of the characteristic curves of voltage which vary sinewise or cosinewise to obtain the curves as illustrated in FIG. 8 and utilize them for bearing indication. Accordingly, a correct bearing indication is made precisely corresponding to the bearing of a source of incident radio waves for all azimuth angles from 0° to 360°.

In the foregoing, an explanation has been made of an embodiment of the invention wherein the magnitude of the voltage signals is equal to that of the voltage signals induced in the non-directional vertical antenna 3. The invention also effectively works even when the magnitude of the voltage signals induced in each of the antennas is not equal to one another.

Figure 9:
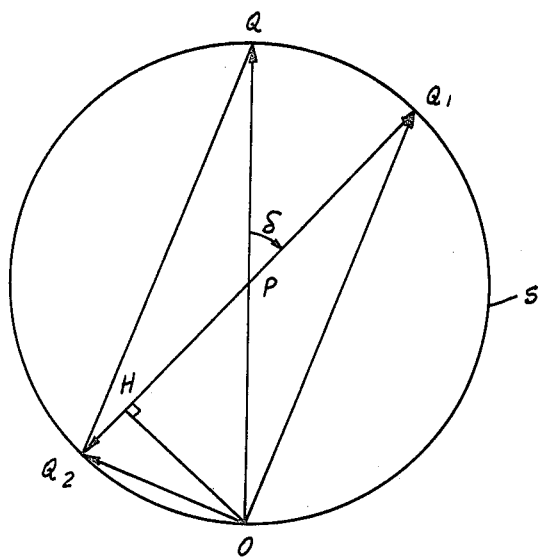
FIG. 9 is a diagram of vector addition for explaining an embodiment of the present invention.

Referring to FIG. 9 showing a vector diagram, a vector OP represents the reception signals caught by the vertical antenna 3, and a vector PQ represents the reception signals caught by the loop antennas 1 or 2. This is the case wherein the magnitude of the signals induced in an antenna is equal to that of the other signals.

When the reception signals caught by the loop antennas 1 or 2 and the ones received by the vertical antenna 3 are combined in phase or 180° out of phase with each other, the vector PQ lies on the vector OP or on an extended line thereof. Hence, the resultant added vector is given by joining the point O and a position on the line OQ determined by a varying vector PQ. This added vector corresponds to the characteristic curves with $\delta=0°$ maintained in FIG. 3.

When the voltage signals induced in the loop antennas 1 or 2 are combined with the voltage signals induced in the vertical antenna 3 with the phase difference $\delta$ existed therebetween, the vector PQ can be represented by a vector $PQ_1$ obtained by turning it by an amount of $\delta$. The reception signals caught by the loop antennas 1 or 2 can be represented by a varying vector decreasing from the vector $PQ_1$ to a vector $PQ_2$ depending on the incident bearing of radio waves. Hence, the combined signals obtained by combining the voltage signals induced in one of the loop antennas and the vertical antenna can be represented by added vector resulting from an addition of the vector OP and either one of the vectors $PQ_1$ or $PQ_2$. Thus, the resultant added vector varies along the line $Q_1Q_2$ from the vector $OQ_1$ to the one $OQ_2$.

The magnitude variation of the vector in this case corresponds to the characteristic curves with $\delta$ being maintained as 15° or 30° or 60° as illustrated in FIG. 3.

Referring to FIG. 9, with the magnitude variation of the vector $PQ_1$, the resultant added vector changes from the vector $OQ_1$ to the one OP. The added vector varies in a simple manner between the maximum vector $OQ_1$ and the minimum one OP. Such a variation manner of magnitude of vector corresponds to the azimuth ranges $D_1$ and $D_4$ in FIG. 3A and to the ranges $D_1$ and $D_2$ in FIG. 3B.

Next, with the magnitude variation of the vector $PQ_2$, the added vector changes from the vector OP to the one $OQ_2$ along the line $PQ_2$. The minimum vector therebetween is given by a line OH perpendicular to the line $PQ_2$. In this case, the added vector decreases from the vector OP to the minimum vector OH and then increases to the vector $OQ_2$. Thus, when the vector $PQ_2$ varies between the points P and $Q_2$, the magnitude of the added vector does not vary in a simple manner as aforementioned, but varies in such a distorted way as firstly decreasing from the maximum magnitude of the voltage signals induced in the vertical 3 to the minimum magnitude and then increasing. This mode of variation corresponds to the azimuth ranges $D_2$ and $D_3$ in FIG. 3B.

The degree of the distorted variation increases with the magnitude of the voltage signals induced in the loop antennas 1 or 2. When the magnitude of the voltage signals induced in one of the loop antennas 1 and 2 is smaller than that of the vector PH, the added vector varies almost monotonously from the vector OP to the minimum vector OH. Consequently, within this range of vector variation, deviation from correct bearing indication can be maintained under a certain level.

When the magnitude of the voltage signals induced in one of the loop antennas 1 and 2 become larger than that of the vector PH, a mode of the distorted variation as aforementioned appears. The degree of the distorted variation increases with the increase of the voltage signals induced in one of the loop antennas. In this case, as easily anticipated, deviation from correct bearing can be considerably decreased by the embodiment according to the invention as illustrated in FIG. 4.

Although, the loop antennas 1 and 2 are used in FIG. 4, these are not the only antennas to be utilized and can be replaced by any kinds of antennas one of which having a directional sensitivity pattern in corresponding one of the X-axis and Y-axis directions. For example, four vertical antennas symmetrically disposed on mutually perpendicular X-axis and Y-axis with the crossing point at its center can also be used in place of two loop antennas.

The voltage signals induced in the non-directional vertical antenna, can also be replaced by averaging in phase the voltage signals induced in each of the vertical antennas disposed on the X-axis and Y-axis.

In FIG. 4, the voltage signals induced in one of the loop antennas 1 or 2 are transformed by means of the transformers $T_x$ or $T_y$ to derive positive phase or negative phase voltages, and these respective voltages are separately combined with the voltage signals induced in the non-directional antenna 3 to generate positive phase and negative phase combined voltages. Instead of deriving positive phase and negative phase voltages from the voltage signals induced in one of the loop antennas 1 and 2, it is also arranged in such a way that the voltage signals induced in the non-directional antenna 3 are switched to obtain positive phase and negative phase voltages therefrom and these voltages are then separately combined with the voltage signals in each of the loop antennas. In this case, a switch must be fitted with the non-directional antenna 3, and be switched from one position to the other one during the period the voltage signals induced in one of the loop antennas being transmitted, thereby producing positive phase and negative phase voltages.

Although, in the embodiment according to the present invention as illustrated in FIG. 4, the comparison circuit 113 (113') compares the stored voltages in the storage circuit $9\bar{a}$ (9$\bar{b}$) with those in the storage circuit 9a (9b), this invention should not be limited to this circuit configuration. It may also be arranged such that the comparison circuit 113 (113') compares the voltages $V_1$ ($V_3$) maintained in the storage circuit 9a (9b) with the voltages $V_o$ held in the storage circuit 9c wherein the voltage signals from the vertical antenna 3 being stored, and controls the selection switch 111 (111') to pass the positive phase combined voltages produced from the storage circuit 9a (9b) when the mutual magnitude relationship becomes $V_1 (V_3) > V_o$, and controls the selection switch to alternatively pass the inverted negative phase combined voltages from the storage circuit 9a (9b) when the mutual relationship is $V_1 (V_3) < V_o$. Similarly, it may also be arranged such that the comparison circuit 113 (113') compares the voltages $V_2$ ($V_4$) maintained in the storage circuit $9\bar{a}$ (9$\bar{b}$) with the voltages $V_o$ in the storage circuit 9c, and controls the selection switch 111 (111') to pass the positive phase combined voltages when the resultant mutual magnitude relationship is $V_2 (V_4) < V_o$, and to alternatively pass the inverted negative phase combined voltages when the resultant mutual relationship is $V_2(V_4) > V_o$.

INDUSTRIAL APPLICABILITY

This invention can also be embodied in an apparatus for measuring the bearing of a source of sound waves. In this case, sound receptors each having a similar directional sensitivity pattern with that of the other one are used in replace of the directive antennas, and a non-directional receptor is used in replace of the non-directional antenna.

What is claimed is:

1. In a direction finder including a directional X-axis antenna having a directional sensitivity pattern in the direction of the X-axis of Cartesian co-ordinates and a directional Y-axis antenna having a directional sensitivity pattern in the direction of the Y-axis thereof and a non-directional antenna, said direction finder comprising means separately combining the voltage signals induced in each of the directional X-axis and Y-axis antenna and the voltage signals induced in the non-directional antenna to obtain combined voltage signals respectively corresponding to the directional X-axis and Y-axis antennas, said direction finder further comprising means for producing X-axis and Y-axis component signals from the rectified and amplified combined voltage signals and the voltage signals induced in the non-directional antenna, and means for indicating the direction determined by a vector addition of the X-axis and Y-axis component signals as the bearing of a source of incoming signals, the improvement wherein the combining means comprises signal generating means for combining and rectifying the voltage signals induced in one of the directional antennas and the ones induced in the non-directional antenna to obtain rectified positive phase and negative phase combined voltage signals with a phase relationship of 180° apart to each other for each of the directive X-axis and Y-axis antennas, said direction finder further comprising selecting means for appropriately selecting the rectified positive phase or negative phase combined voltage signals within an azimuth range wherein the magnitude of the rectified positive and negative phase combined voltage signals varies in a distorted manner with respect to sine or cosine curves depending on the change of the bearing of the source of incoming signals.

2. A direction finder as defined in claim 1, wherein the signal generating means separately combines the positive phase and negative phase voltage signals induced in one of the X-axis and Y-axis signal receivers and the signal voltages induced in the non-directional signal receiver to produce the positive phase and negative phase combined voltage signals.

3. A direction finder as defined in claim 1, wherein the signal generating means separately combines the positive phase and negative phase voltage signals with a phase relationship of 180° to each other generated from the voltage signals induced in the non-directional signal receiver and the voltage signals induced in one of the directive X-axis and Y-axis signal receivers to produce the positive phase and negative phase combined voltage signals.

4. A direction finder as defined in claim 1, wherein the selecting means compares in magnitude the rectified positive phase and negative phase combined voltage signals $|V_1|$ and $|V_2|$ generated in association with the directive X-axis signal receiver with each other, and produces the rectified positive phase combined voltage signals when the mutual magnitude relationship therebetween is $|V_1| > |V_2|$, and produces the rectified negative phase combined voltage signals when the relationship therebetween is $|V_1| < |V_2|$.

5. A direction finder as defined in claim 1, wherein the selecting means compares in magnitude the rectified positive phase and negative phase combined voltage signals $|V_3|$ and $|V_4|$ generated in association with the directive Y-axis antenna with each other, and produces the rectified positive phase combined voltage signals when the mutual magnitude relationship therebetween is $|V_3| > |V_4|$, and produces the rectified negative phase combined voltage signals when the mutual relationship therebetween is $|V_3| < |V_4|$.

6. A direction finder as defined in claim 1, wherein the selecting means compares in magnitude the rectified positive phase combined voltage signals $V_1(V_3)$ generated in association with one of the directional signal receivers and the rectified voltage signals $V_o$ from the non-directional antenna with each other, and produces the rectified positive phase combined voltage signals when the mutual magnitude relationship therebetween is $V_1(V_3) > V_o$, and produces the rectified negative phase combined voltage signals when the mutual relationship therebetween is $V_1(V_3) < V_o$.

7. A direction finder as defined in claim 1, wherein the selecting means compares in magnitude the rectified negative phase combined voltage signals $V_2(V_4)$ generated in association with one of the directional antenna and the rectified voltage signals $V_o$ from the non-directional antenna with each other, and produces the rectified positive phase combined voltage signals when the mutual magnitude relationship therebetween is $V_2(V_4) < V_o$, and produces the rectified negative phase combined voltage signals when the relationship therebetween is $V_2(V_4) > V_o$.

8. A direction finder as defined in claim 1 or 4 or 5, wherein the selecting means comprises, a comparison circuit with the rectified positive phase combined voltage signals $V_1(V_3)$ and the rectified negative phase combined voltage signals $V_2(V_4)$ being separately supplied to the two input terminals thereof, for comparing in magnitude these two kinds of the voltage signals with each other, and for producing a pass signal when the mutual magnitude relationship therebetween is $|V_1|\ (|V_3|) > |V_2|\ (|V_4|)$, and for producing a switch signal when the relationship is $|V_1|\ (|V_3|) < |V_2|\ (|V_4|)$, an inversion circuit with the rectified negative phase combined voltage signals $V_2(V_4)$ and the rectified voltage signals induced in the non-directional antenna being separately supplied to the two input terminals thereof, for inverting in polarity the rectified negative phase combined voltage signals at a level of the magnitude of the rectified voltage signals, and a switch circuit with the rectified positive phase combined voltage signals $V_1(V_3)$ and the output signals from the inversion circuit being separately supplied to the two input terminals thereof, for passing the rectified positive phase combined voltage signals when the pass signal is provided with the control terminal thereof, and for passing the output signals from the inversion circuit when the switch is received thereby.

* * * * *